United States Patent [19]

Mohler

[11] Patent Number: 5,930,337
[45] Date of Patent: Jul. 27, 1999

[54] DYNAMIC MESSAGE-MAILBOX SIZE VARIATION

[75] Inventor: David S. Mohler, Arvada, Colo.

[73] Assignee: Lucent Technologies Inc., Murray Hill, N.J.

[21] Appl. No.: 08/794,944

[22] Filed: Feb. 4, 1997

[51] Int. Cl.[6] .................................................. H04M 1/64
[52] U.S. Cl. ..................... 379/88.22; 379/88.09
[58] Field of Search ................... 379/67, 88, 89,
379/93.24, 100.01, 67.1, 88.07, 88.09, 88.13,
88.22, 88.28; 395/600, 650; 358/400, 401,
402

[56] References Cited

U.S. PATENT DOCUMENTS

| | | | |
|---|---|---|---|
| 5,247,674 | 9/1993 | Kogure | 395/650 |
| 5,339,411 | 8/1994 | Heaton, Jr. | 395/600 |
| 5,461,665 | 10/1995 | Shur et al. | 379/67 |
| 5,483,578 | 1/1996 | Ackermann et al. | 379/88 |

*Primary Examiner*—Krista Zele
*Assistant Examiner*—Scott L. Weaver
*Attorney, Agent, or Firm*—David Volejnicek

[57] ABSTRACT

A messaging system (100) automatically correctly resizes users' mailboxes (160–161) based on information gathered through periodic activity audits (206). The gathered information includes frequency of login to the messaging system and time of last login for each login ID and the fill level and fill-level frequency for each mailbox. Periodicity of audits, time-to-login-ID-expiration period, upper and lower fill-level thresholds, time-to-storage-allotment-change period, and allotment-change size and mailbox size limits are administratively set (202–204). If audit reports indicate that a login ID has not been used for the time-to-login-ID-expiration period, the user is warned and if the user does not respond, the login is expired (208–224). If audit reports indicate that one of the thresholds has been exceeded without the other threshold also having been exceeded for the time-to-storage-allotment-change period, the mailbox size is incremented or decremented by the allotment-change size, either immediately or upon approval by the mailbox user, within the mailbox size limits (210–258). A user can also request to have the user's mailbox incremented (260).

19 Claims, 3 Drawing Sheets

DYNAMIC MESSAGE-MAILBOX SIZE VARIATION

TECHNICAL FIELD

This invention relates to messaging systems.

BACKGROUND OF THE INVENTION

Messaging systems typically allocate message mailboxes of fixed size to the subscribers of the messaging service. So if a subscriber rapidly receives a large number of messages or does not regularly retrieve received messages, there is a good chance that the capacity of the subscriber's mailbox will be exceeded and the mailbox will overflow. This results in loss of messages or inability of message senders to leave further messages for the subscriber. Yet other subscribers may no longer be using their mailboxes, or use only a small portion of their mailboxes' capacities, resulting in a waste of storage space.

Many voice and/or multimedia messaging systems have warning announcements which are provided to subscribers to advise them of the fill level of their mailboxes. While this is a worthwhile feature, it does not specifically help with the problem of mailbox overflow conditions. It can be very frustrating to a caller to be informed that the party they are trying to reach has a full mailbox. The result can be loss of business, loss of necessary information, and/or loss of productivity. Two other related problems, from the system administrator's point of view, are the allocation of storage space to mailboxes which are seldom or never fully utilized, and the persistence of logins and their associated mailboxes that are still in place for subscribers who have changed messaging systems or ceased to be subscribers. This last problem is especially of concern in very large systems and/or those designed for public service-provider use.

Some systems provide audits that the system administrator may use manually to provide a means for sizing mailboxes and for expiring logins. But this does not provide the prompt response to changing conditions that is desirable.

SUMMARY OF THE INVENTION

This invention is directed to solving these and other problems and disadvantages of the prior art. Generally according to the invention, there is provided an arrangement for automatically (i.e., without human involvement) correctly resizing (and even deleting) users' mailboxes, based on information gathered through periodic activity audits. The gathered information illustratively includes frequency of login to the messaging system and time of last login for each login ID, and the fill level and fill-level frequency for each mailbox.

Specifically according to the invention, there is provided a method of and an apparatus for automatically adjusting an amount of storage allocated to a mailbox that comprises an allocated amount of the storage. The method comprises the step of automatically determining whether information stored in the mailbox occupies more than an upper threshold amount of the allocated amount of the storage, where the upper threshold amount is less than the allocated amount. The method also comprises the step of automatically allocating an additional amount of the storage to the mailbox in response to repeated determinations that the amount occupied by the stored information exceeds the upper threshold amount. The method preferably further comprises the steps of automatically determining whether the information stored in the mailbox occupies less than a lower (preferably non-zero) threshold amount of the allocated amount of the storage, and automatically deallocating an amount of the allocated storage from the mailbox in response to repeated determinations that the lower threshold amount exceeds the amount occupied by the stored information. Yet further the method preferably comprises the steps of automatically determining whether a user of the mailbox has logged in to the mailbox, and automatically deallocating the allocated storage from the mailbox in response to repeated determinations that the user has not logged in to the mailbox. The apparatus effects the steps of the method. Preferably, the apparatus includes an effector—any entity that effects the corresponding step, unlike a means—for each of the method steps. The apparatus may take the form of a computer-readable medium containing software which, when executed in a computer, causes the computer to perform the method steps.

The invention solves, at least partially, the problem of inefficient mailbox storage allocation, by enabling storage allocation to be automatically adjusted based on the dynamic behavior of the messaging system. For example, users with chronically overflowed mailboxes are automatically allocated more storage, users who very seldom or never fully utilize their message mailboxes are automatically allocated less storage, users who have left the system or never log in have their login IDs automatically expired and their mailbox storage freed up, and users who experience a sudden change in message activity can have their mailbox storage automatically sized accordingly.

These and other features and advantages of the invention will become more apparent from the following description of an illustrative embodiment of the invention taken together with the drawing.

DETAILED DESCRIPTION

Figure 1:
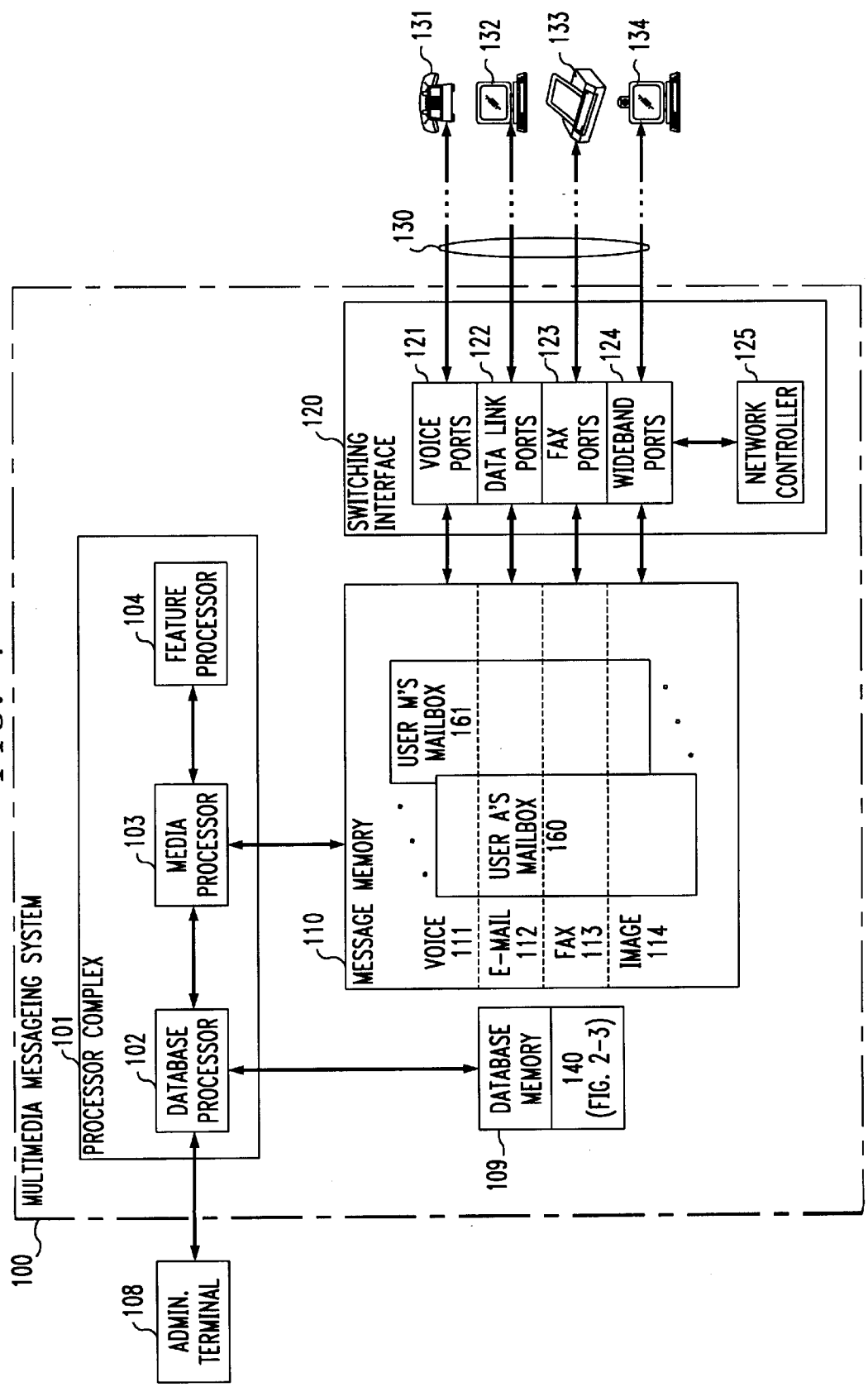
FIG. 1 is a block diagram of a messaging system that implements an illustrative example of the invention.

FIG. 1 shows, in block diagram form, an illustrative example of a multimedia messaging system 100. System 100 includes a processor complex 101, a database memory 109, a message memory 110, and a switching interface 120. Processor complex 101 illustratively includes three processors 102–104. A database processor 102 controls database memory 109 which stores information, including control programs and user data—including user login identifiers (login IDs) of the subscribed users—needed for the operation of system 100. An administrator interacts with database processor 102 via an external administrative terminal 108 to administer (program) the contents of database memory 109. A feature processor 104 uses contents of database memory 109 to effect the various subscriber-related features that system 100 provides. And a media processor 103 uses contents of database memory 109 to manage message memory 110, including defining subscribed users' mailboxes 115–116 therein.

Message memory 110 contains users' mailboxes 160–161 for storing message information expressed in various different media, including voice 111, e-mail 112, fax 113, and image 114. Media processor 103 defines users' mailboxes 160–161 as logical entities within message memory 110. As logical entities, mailboxes 160–161 can be redefined and thus changed by media processor 103. Message memory 110 is interfaced to external communications links 130 by switching interface 120 which comprises a variety of ports 121–124. Voice ports 121 interface voice information 111 to communications links 130, data ports 122 interface e-mail information 112 to communications links 130, fax ports 123 interface fax information 113 to communications links 130, and wideband ports 124 interface image information 114 to communications links 130. Ports 121–124 operate under control of a network controller 125.

Communications links 130 may be any suitable communications media—telephone links, LANS, ISDN links, H.320 links, etc. Links 130 connect system 100 to message-generating and message-retrieving user terminals, such as telephones 131; data terminals, PCS and/or workstations 132; fax machines and/or fax enabled PCs 133; and video workstations and/or picturephones 134.

As described so far, messaging system 100 is conventional. It is illustratively the Lucent Technologies Intuity® multimedia messaging system.

Figure 2:
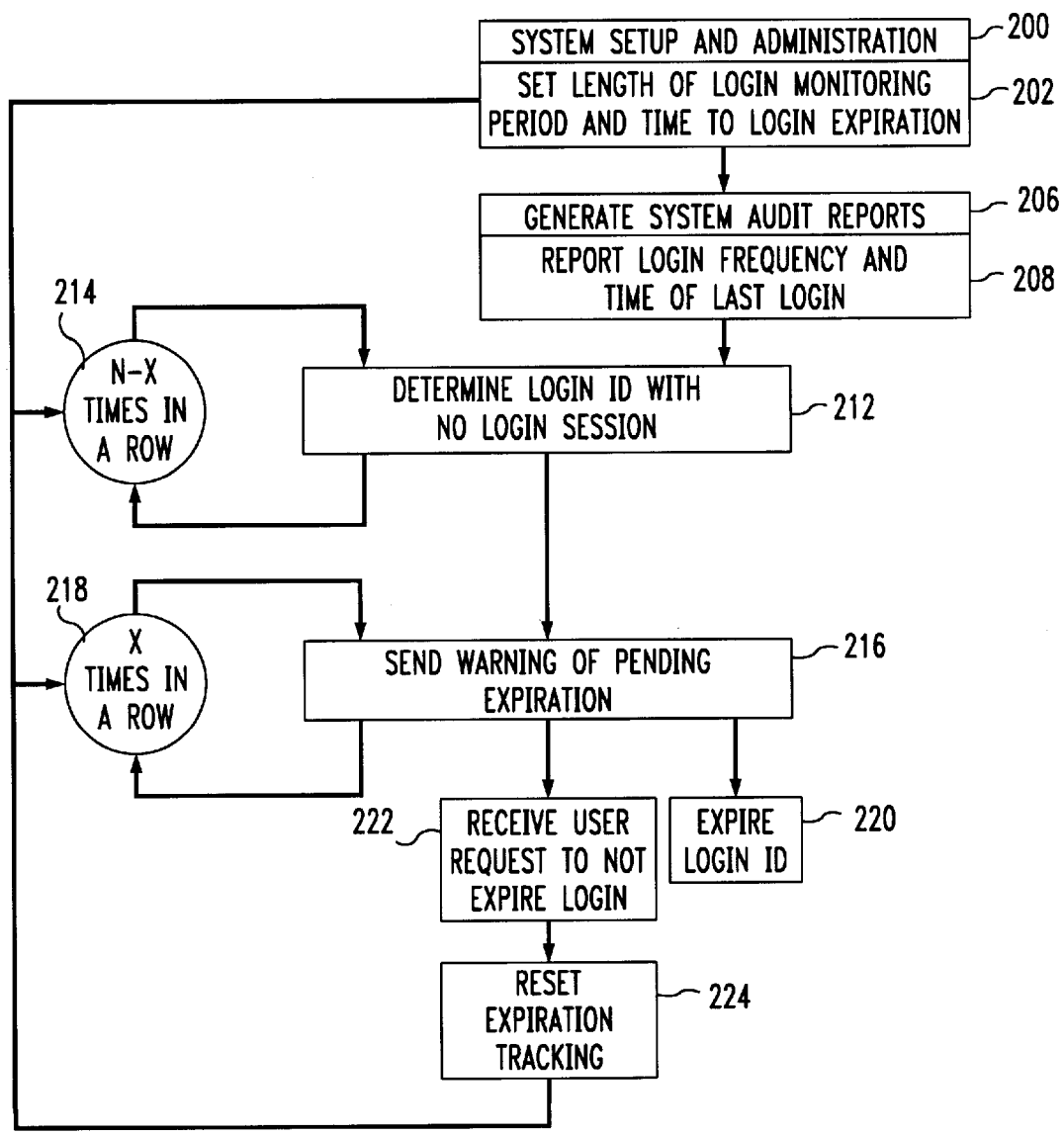
FIGS. 2 and 3 are flow diagrams of functions performed by a processor complex of the messaging system 100 to implement the illustrative example of the invention.
Figure 3:
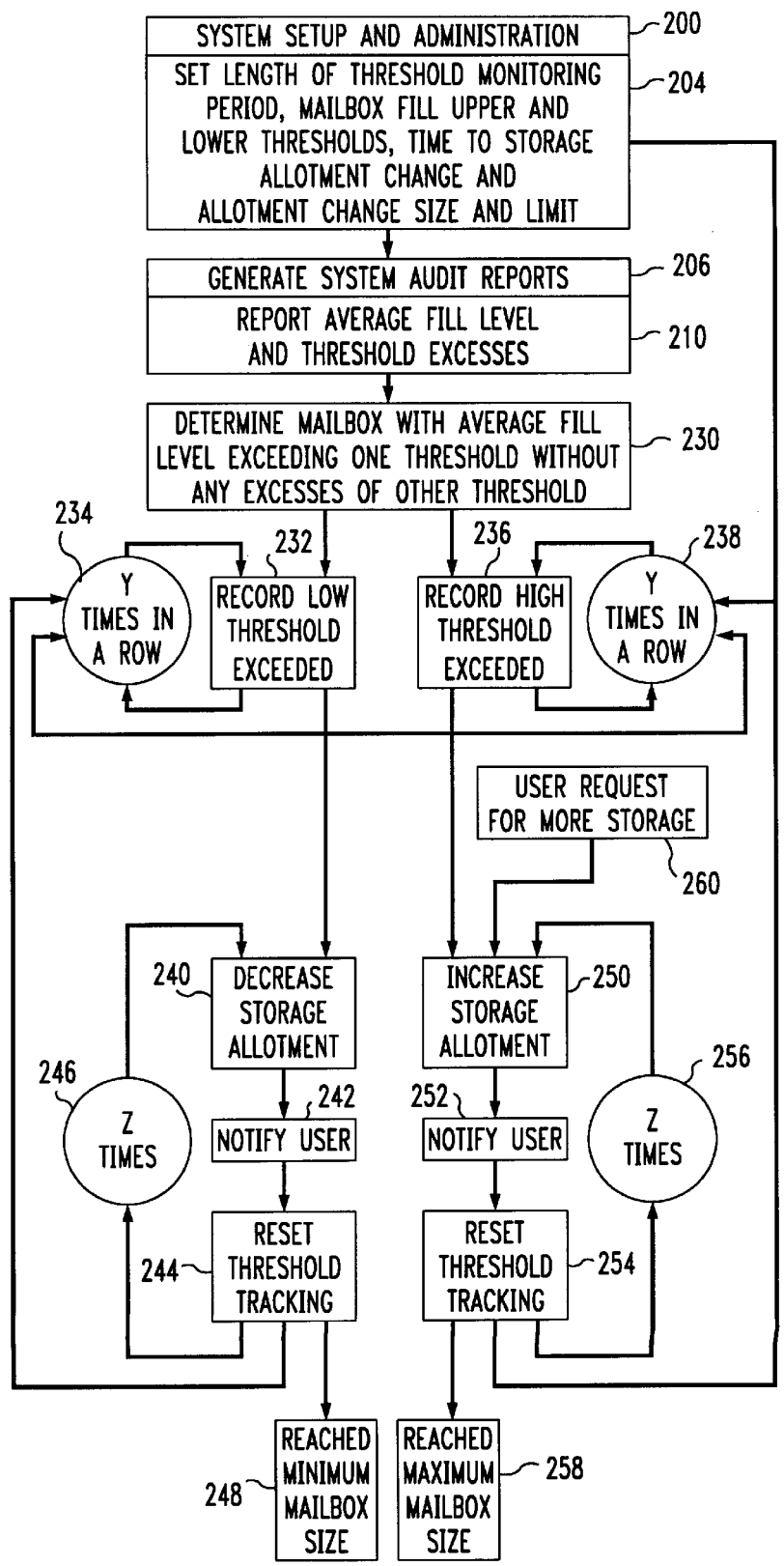

According to the invention, database memory 109 includes one or more control programs 140 which, when executed by processor complex 101, implement the functionality diagramed in FIGS. 2–3.

At initial system startup and administration, at step 200 of FIGS. 2 and 3, in addition to conventional administration data, database processor 102 stores in database memory 109 a length of a login monitoring period that will be used to report which login IDs (i.e., which users) failed to log into system 100 during each such period, and a time-to-login-expiration that will be used to identify unused mailboxes, typically expressed as a multiple (e.g., N) of the login monitoring period, at step 202 of FIG. 2. Illustratively, a login monitoring period may be a day, and a time-to-login-expiration may be 30 days. This data is specified by the system's administrator via administrative terminal 108.

Further at system startup and administration, at step 200 of FIGS. 2 and 3, database processor 102 stores in database memory 109 a mailbox-fill upper threshold and a mailbox-fill lower threshold, a length of a threshold monitoring period that will be used to report any upper and lower fill threshold overflows and underflows for each mailbox 160–161, a storage-size allotment change size representing an amount of memory 110 by which the size of a mailbox 160–161 may be incremented or decremented if the user of a mailbox often exceeds one or the other of the fill thresholds, and a limit on the minimum, and optionally also on the maximum, allowed size of mailboxes 160–161, at step 204 of FIG. 3. Illustratively, a threshold monitoring period may be a day, a fill upper threshold may be ⅔ mailbox capacity, a fill lower threshold may be ⅓ mailbox capacity, a storage size allotment change size may be 2–5 minute increments, and a size limit may be defined as 2–4 size increments or decrements. This data is again specified by the system's administrator via administrative terminal 108.

Once system 100 is administered and placed into operation, media processor 103 generates various system reports, at step 206 of FIGS. 2 and 3. These include per-login monitoring period reports on the frequency of login into system 100 of each login ID and the time of last login of each login ID, at step 208 of FIG. 2, and per-threshold monitoring period reports on the average fill level and upper and lower fill threshold excesses of each mailbox 160–161, at step 210 of FIG. 3. These reports are then used by feature processor 104 in the manner described below.

From the report of login frequency and time of last login, feature processor 104 determines each login ID that has not logged in during the reporting (login monitoring) period, at step 212 of FIG. 2. For each of those login IDs, processor 104 checks if this is at least the (N–X)th time in a row that the login ID has not logged in, at step 214, where N is the number of login monitoring periods in the time to login expiration (see step 202) and X is an integer greater than 0. If this is not at least the (N–X)th time in a row that the login ID has not logged in during the login monitoring period, processor 104 will simply return to step 212 for that login ID at the next login monitoring report. If this is at least the (N–X)th time, the login ID is shortly about to expire, and so processor 104 sends a warning of the pending expiration to that login ID, e.g., to its corresponding user's mailbox 160, at step 216. Processor 104 then checks if this is the Xth time in a row that the warning has been sent, at step 218. If not, processor 104 will simply return to step 212 for that login ID at the next login monitoring report. If this is the Xth time that the warning has been sent and no user response to the warning has been received, processor 104 expires the login ID, at step 220. Expiration of the login ID means that its owner is no longer able to log in and storage in message memory 110 occupied by the login ID owner's mailbox 160 is freed up for use by others. If, however, before reaching step 220, system 100 receives, in response to a message of pending login ID expiration, a request from the login ID owner to not expire the login ID, at step 222, processor 104 resets the expiration tracking at steps 214 and 218 for that login ID, at step 224, and begins the tracking anew, at step 212, upon receipt of the next login tracking report.

Returning to step 206, from the report of the per-mailbox average fill level and fill threshold excesses generated at step 210 of FIG. 3, feature processor 104 determines each mailbox 160–161 whose average fill level during the reporting (threshold monitoring) period has exceeded one of the thresholds and whose actual fill level has at no time during the reporting period exceeded the other threshold, at step 230. If a mailbox 160 has exceeded on average the low fill threshold without exceeding the high fill threshold, feature processor 104 makes a record of it, at step 232, and checks if this has happened to mailbox 160 for Y reporting periods in a row, at step 234, where Y is a predetermined integer. If not, feature processor 104 will return to step 230 at the next report. If a mailbox 160 has been found at step 230 to have exceeded on average the high fill threshold without having exceeded the low fill threshold, feature processor 104 makes a record of it, at step 236, and checks if this has happened to mailbox 160 for Y reporting periods in a row, at step 238. If not, feature processor 104 will return to step 230 at the next report.

When the low fill threshold is exceeded by a mailbox 160 Y times in a row, as indicated at step 234, media processor 103 decreases the storage allotment of mailbox 160 by the specified storage allotment change size, at step 240, and feature processor 104 notifies the owner of mailbox 160 thereof, at step 242, and also resets the low fill threshold tracking for that mailbox 160, at step 234, at step 242. Such reduction of the storage allocated to a mailbox is allowed to occur only up to a predetermined number (Z) of times, as indicated at step 246. At that point, the minimum allowed mailbox size is reached, and no further reduction in its storage allotment are permitted, as indicated at step 248.

Correspondingly, when the high fill threshold is exceeded by a mailbox 160 Y times in a row, as indicated at step 238, media processor 103 increases the storage allotment of mailbox 160 by the specified storage allotment change size, at step 250, and feature processor 104 notifies the owner of mailbox 160 thereof, at step 252, and also resets the high fill threshold tracking for that mailbox 160, at step 250, at step 254. The increase in the storage allotment at steps 250 et seq. may also be done in response to receipt of a request from the user of mailbox 160 for more storage, at step 260. This allows the user to temporarily adjust the mailbox size in anticipation of an unusually-high mailbox fill level, such as a surge of messaging activity due to a time-limited project, or non-retrieval of messages due to the user going on vacation. The increase of the storage allocated to a mailbox is allowed to occur only up to a predetermined number (Z) of times, as indicated at step 256. At that point, the maximum mailbox size is reached and no further increases in its storage allotment are permitted, as indicated at step 258.

The type of operation described above is particularly suited for a messaging service where the users do not pay for the service, e.g., an in-house messaging system in a corporation. However, for public systems where users are charged for their mailbox storage space, it may be preferable to precede steps 240 and 250 with automatic announcements to a mailbox owner appraising the owner of the situation and giving the owner the option of decreasing or increasing, respectively, the mailbox size, with a corresponding change to the owner's cost.

Following the mailbox owner opting to decrease or increase the mailbox size and notifying the system of his or her election, the decrease or increase is then effected automatically at step 240 or 250, respectively, as described above.

Of course, various changes and modifications to the illustrative embodiment described above will be apparent to those skilled in the art. For example, the results of the periodic activity audit may be used to detect the need for more storage to be added to the system and to advise the system administrator accordingly. Likewise, a mailbox user may be advised by the system each time that the system takes an action with respect to that user's mailbox or login ID. Or, the fill thresholds and storage allotments may be either fixed, or variable such as being proportional to the present size of a mailbox. Furthermore, the principles of the invention may be applied in various environments, such as file-transfer systems, fax servers and their queues, call center queues, and all types of messaging systems. Additionally, the service provider may use summary reports of average fill-levels and/or numbers of logins per unit time to alter their pricing structure for such a service in a service-for-fee environment. Such changes and modifications can be made without departing from the spirit and the scope of the invention and without diminishing its attendant advantages. It is therefore intended that such changes and modifications be covered by the following claims.

The invention claimed is:

1. A method of automatically adjusting an amount of storage allocated to a mailbox comprising an allocated amount of the storage, comprising the steps of:

automatically determining whether an amount of information stored in the mailbox occupies more than an upper threshold amount of the allocated amount of the storage, the upper threshold amount being less than the allocated amount; and automatically allocating an additional amount of the storage to the mailbox, in response to repeated determinations that the amount occupied by the stored information exceeds the upper threshold amount.

2. The method of claim 1 further comprising the steps of:

automatically determining whether the amount of the information stored in the mailbox occupies less than a lower threshold amount of the allocated amount of the storage; and automatically deallocating an amount of the allocated storage from the mailbox, in response to repeated determinations that the lower threshold amount exceeds the amount occupied by the stored information.

3. The method of claim 2 wherein:

the lower threshold amount is a non-zero amount.

4. The method of claim 2 wherein:

the step of automatically determining whether the amount of the stored information occupies more than the upper threshold amount comprises the step of automatically determining whether the amount of the stored information occupies more than the upper threshold amount without occupying less than the lower threshold amount in an interval of time; and the step of automatically determining whether the amount of the stored information occupies less than the lower threshold amount comprises the step of automatically determining whether the amount of the stored information occupies less than the lower threshold amount without occupying more than the upper threshold amount in the interval of time.

5. The method of claim 1 further comprising the step of:

automatically allocating an additional amount of the storage to the mailbox, in response to receipt of a request from an owner of the mailbox.

6. The method of claim 1 further comprising the steps of:

automatically determining whether an owner of the mailbox has logged into the mailbox; and automatically deallocating the allocated storage from the mailbox, in response to repeated determinations that the owner has not logged into the mailbox.

7. The method of claim 1 further comprising the steps of:

automatically determining whether an owner of the mailbox has logged into the mailbox using a login identifier; and automatically deallocating the allocated storage from the mailbox and expiring the login identifier, in response to repeated determinations that the owner has not logged into the mailbox using the login identifier.

8. The method of claim 4 further comprising the steps of:

automatically determining whether an owner of the mailbox has logged into the mailbox; and automatically deallocating the allocated storage from the mailbox, in response to repeated determinations that the owner has not logged into the mailbox.

9. The method of claim 8 wherein:

the step of automatically determining whether an owner has logged in comprises the step of automatically determining whether the owner has logged into the mailbox using a login identifier of the owner; and the step of automatically deallocating the allocated storage comprises the step of automatically deallocating the allocated storage from the mailbox and expiring the login identifier, in response to repeated determinations that the owner has not logged into the mailbox using the login identifier.

10. The method of claim 1 wherein:

the step of automatically allocating comprises the steps of automatically offering an allocation of an additional amount of the storage to an owner of the mailbox, in response to the repeated determinations that the amount occupied by the stored information exceeds the upper threshold amount; and automatically allocating the additional amount of the storage to the mailbox, in response to the owner accepting the offered allocation.

11. The method of claim 2 wherein:

the step of automatically deallocating comprises the steps of automatically offering a deallocation of an amount of the allocated storage to the owner of the mailbox, in response to the repeated determinations that the lower threshold amount exceeds the amount occupied by the stored information; and automatically deallocating the amount of the allocated storage from the mailbox, in response to the owner accepting the offered deallocation.

12. An apparatus that performs the steps of claims 1 or 2 or 3 or 4 or 5 or 6 or 7 or 8 or 9 or 10 or 11.

13. A computer-readable medium containing software which, when executed in a computer, causes the computer to perform the steps of claims 1 or 2 or 3 or 4 or 5 or 6 or 7 or 8 or 9 or 10 or 11.

14. An apparatus comprising:

a mailbox comprising an allocated amount of storage;

an effector of automatically determining whether an amount of information stored in the mailbox occupies more than an upper threshold amount of the allocated amount of storage, the upper threshold amount being less than the allocated amount; and an effector, responsive to repeated determinations of the amount occupied by the stored information exceeding the upper threshold amount, of automatically allocating an additional amount of storage to the mailbox.

15. The apparatus of claim 14 further comprising:

an effector of automatically determining whether the amount of the information stored in the mailbox occupies less than a non-zero lower threshold amount of the allocated amount of the storage; and an effector, responsive to repeated determinations of the upper threshold amount exceeding the amount occupied by the stored information, of automatically deallocating an amount of the allocated storage from the mailbox.

16. The apparatus of claim 15 further comprising:

an effector of automatically determining whether an owner of the mailbox has logged into the mailbox; and an effector responsive to repeated determinations that the owner has not logged into the mailbox, of automatically deallocating the allocated storage from the mailbox.

17. An apparatus comprising:

a mailbox comprising an allocated amount of storage;

means for automatically determining whether an amount of information stored in the mailbox occupies more than an upper threshold amount of the allocated amount of storage, the upper threshold amount being less than the allocated amount; and means responsive to repeated determinations of the amount occupied by the stored information exceeding the upper threshold amount, for automatically allocating an additional amount of storage to the mailbox.

18. The apparatus of claim 17 further comprising:

means for automatically determining whether the amount of the information stored in the mailbox occupies less than a non-zero lower threshold amount of the allocated amount of storage; and means responsive to repeated determinations of the lower threshold amount exceeding the amount occupied by the stored information, for automatically deallocating an amount of the allocated storage from the mailbox.

19. The apparatus of claim 18 further comprising:

means for determining whether an owner of the mailbox has logged into the mailbox; and means responsive to repeated determinations that the owner has not logged in, for deallocating the allocated storage from the mailbox.

\* \* \* \* \*